July 28, 1970   D. A. BRISTOL ET AL   3,521,945
INSTRUMENT LENS SUPPORT

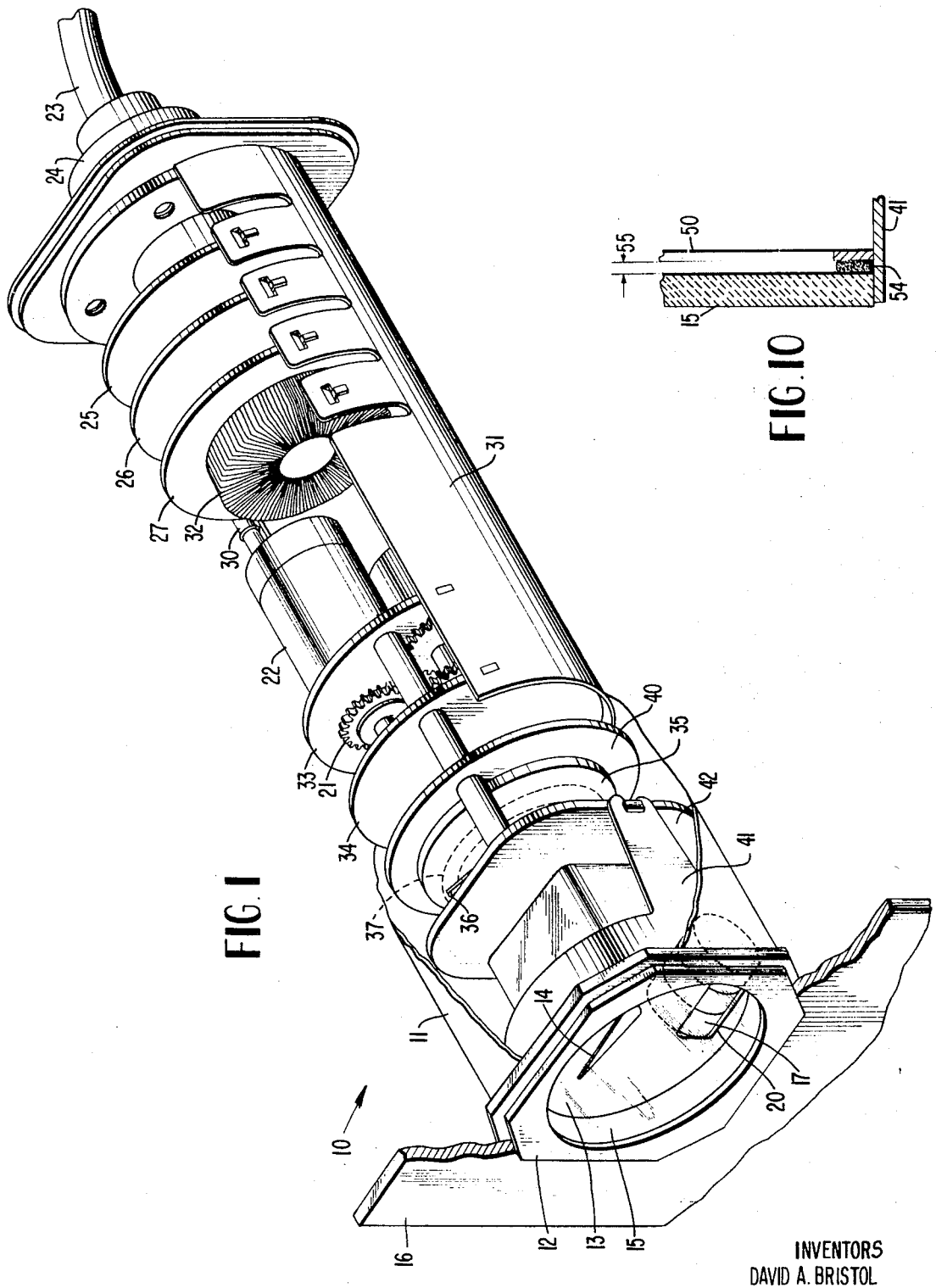

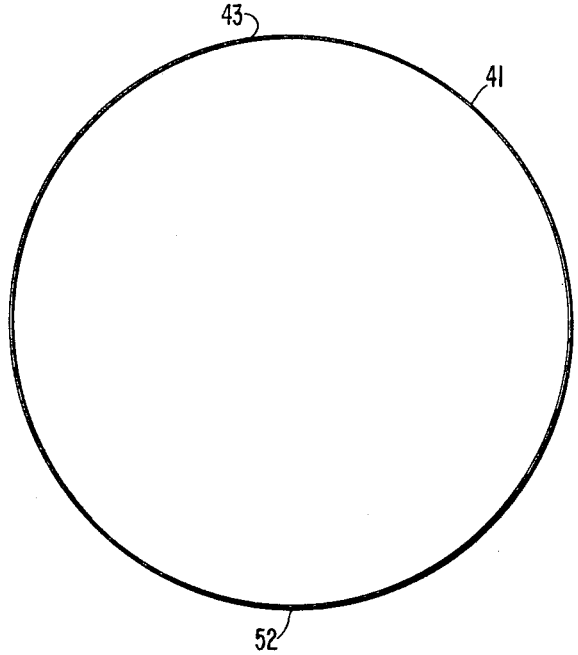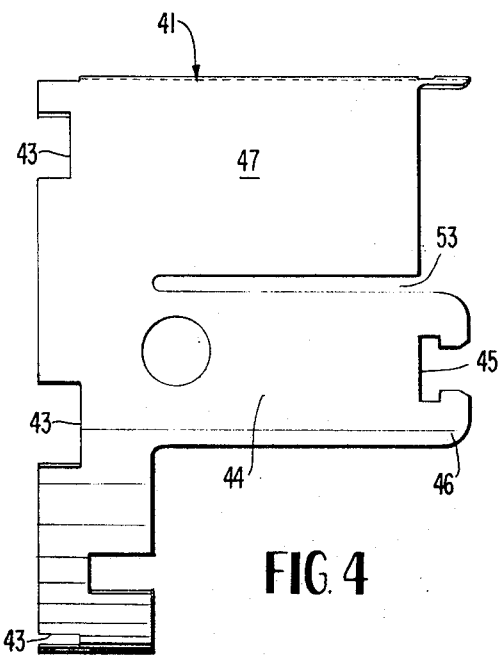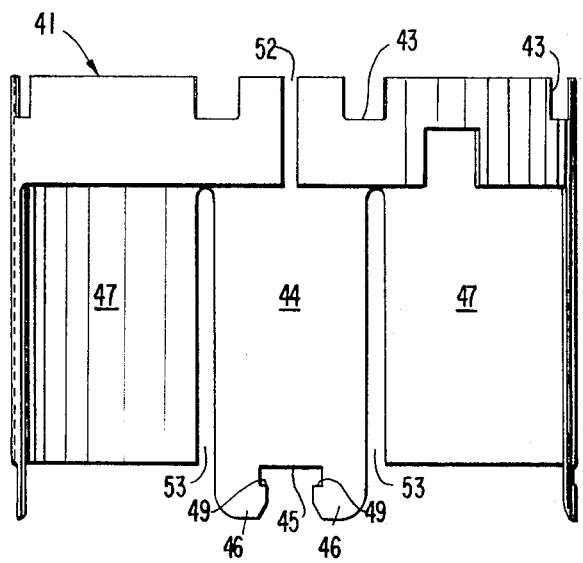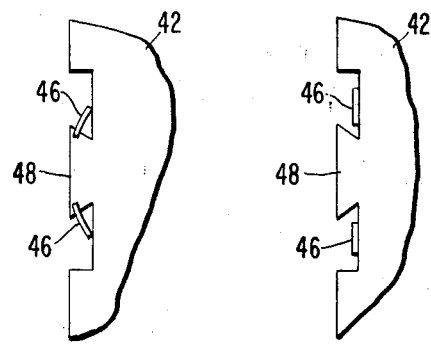

Filed Aug. 7, 1968   3 Sheets-Sheet 3

INVENTORS
DAVID A. BRISTOL
FRANK A. FERREN

BY *Melvin M. Goldenberg*
ATTORNEY

United States Patent Office 3,521,945
Patented July 28, 1970

3,521,945
INSTRUMENT LENS SUPPORT
David A. Bristol, Lynnfield, and Frank A. Ferren, Marblehead, Mass., assignors to General Electric Company, a corporation of New York
Filed Aug. 7, 1968, Ser. No. 804,723
Int. Cl. G02b 7/02
U.S. Cl. 350—257                    4 Claims

ABSTRACT OF THE DISCLOSURE

A support for removably supporting a lens or face plate of a condition-responsive indicating instrument. The support comprises, basically, a hollow cylinder formed of sheet metal at a diameter slightly smaller than the lens to be supported. The front end of the cylinder receives the lens, and the back end attaches axially to the instrument mechanism. Various cutouts in the cylinder facilitate its assembly to the instrument and its supporting function. At the front end of the cylinder, the cutouts receive a spacer which acts as a shelf to support the lens under axial loads; while cutouts at the back provide three rearwardly extending legs notched at their extremities for attachment to cooperating tabs on one of the mechanism support plates. Two rearwardly extending "skirts" located between the extended legs prevent stray light fram falling upon the internal mechanism of the instrument.

BACKGROUND OF THE INVENTION

This invention relates generally to condition-responsive indicating instrument and, more particularly, to an apparatus for supporting a lens or display glass on the front of such an instrument.

In many past designs of indicating instruments, the lens has been irremovably fastened directly to the indicator case by soldering or some such method. The inner surface of a case-attached lens is very difficult to clean, however, and a removable lens is obviously preferable if hermetic sealing of the instrument is not required.

Removable lens supports have therefore come into use. One such support attaches to the instrument by means of threads around the outer perimeter of the instrument. This threading operation requires time and money in manufacture and assembly and does not always result in an accurate positioning of the lens. Another type of design, known as the front-end cup, utilizes a pair of concentric hollow cylinders, one of which fits within the other. A force fit is maintained between the cylinder which carries the lens and the cylinder which acts as the instrument casing. This design, however, is accompanied by appreciable stresses at the base of the legs of the cylinders caused by the radial loads acting upon them. Stresses of this sort in a lens support can cause peeling of cement used to attach the lens to the support and, sometimes, cracking of the lens.

SUMMARY OF THE INVENTION

It is an object of this invention therefore to removably support a lens at the front of a condition-responsive indicating instrument while eliminating the stresses in the support caused by radial loads acting upon it.

The further objects of this invention are to provide a lens support wherein the lens may be securely attached to the internal mechanism of the instrument, yet be removable from it for servicing, and wherein the support does not interfere with the visibility or the operation of the display unit of the indicator and yet prevents stray light from falling upon the indicator.

Briefly stated, the objects of this invention are achieved by providing a lens support which attaches axially to the instrument rather than radially. The support comprises a hollow cylinder, one end of which axially attaches to the indicating instrument and the other end of which receives the lens. The cylinder is radially expansible due to a slit along its entire axial length and is opened to its correct inner diameter by a circular spacer which fits within it and also acts as a shelf to axially support the lens. The lens is cemented to the inner surface of the support but may be removed therefrom by peeling back the cylinder from the perimeter of the lens.

BRIEF DESCRIPTION OF THE DRAWINGS

While the specification concludes with claims particularly pointing out and distinctly claiming the subject matter of the invention which is sought to be protected, an understanding of the invention may be gained from the following detailed description of a preferred embodiment in connection with the accompanying drawings in which:

FIG. 1 is a perspective view of an indicating instrument which incorporates this invention;

FIG. 2 is a top view of a portion of the support showing the notches for receiving the spacer;

FIGS. 3, 4 and 5 are a front, side and bottom view, respectively, of the subject support;

FIGS. 8 and 9 are partial expanded views of the tabs of the support plate with the connecting arms shown first in their attached position and then in their position during attachment; and FIG. 10 is a partial sectional view of the support, spacer and lens in their respective positions.

DESCRIPTION OF THE PREFERRED EMBODIMENT

Figure 6:
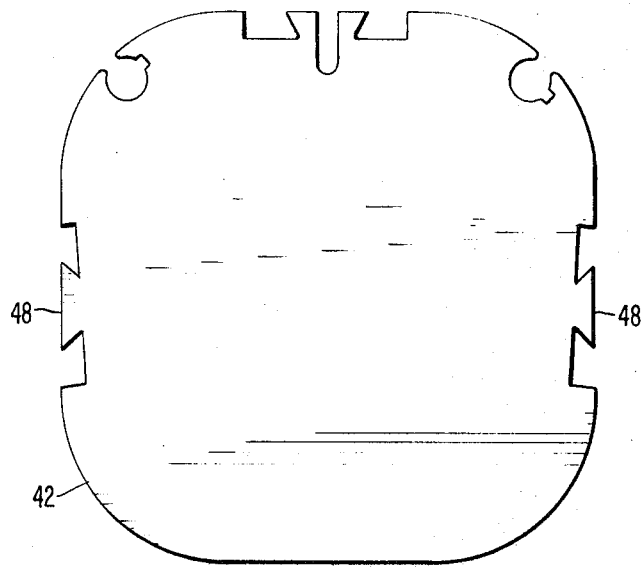
FIG. 6 is a plan view of the outline of the support plate to which the lens support attaches.

Referring to the figures wherein like numerals refer to like elements throughout, one example of a condition-responsive indicating instrument, generally designated by numeral 10, with which the invention may be put to use is shown in FIG. 1 wth most of its housing 11 removed. Such an instrument generally includes a visible portion including a flange 12, a scale plate 13, a condition indicating pointer 14, and a transparent lens 15 over the scale plate 13 and the indicating pointer 14. This assembly is mounted on the front surface of a panel 16. These elements constitute a condition indicating instrument which provides a reading when the indicating pointer 14 is driven along the scale plate 13 in response to a driving signal.

Means for providing the driving signal are disposed behind the panel 16 within the housing 11. Since various means for driving the indicating pointer 14 and circuitry and mechanical elements for such a system are known in the art; and since these elements do not form part of this invention, they are only shown in outline and will be discussed just briefly. The indicating pointer 14 and a counter 17, disposed behind the scale plate 13 and visible through an aperture 20, are driven through a gear mechanism 21 by a servomotor 22. The servomotor 22 is driven in response to sensor signals coupled to the indicating instrument 10 by a cable 23 which is attached to a connector assembly 24 and then coupled to electronic circuits formed on a plurality of printed circuit boards 25, 26 and 27 interconnected by internal cable means 30 and maintained in position by a support means 31.

As specifically illustrated in FIG. 1, a power transformer 32 is mounted to the circuit board 27; and this is connected through the cable means 30 and circuitry on the printed circuit boards to the servomotor 22 which is mounted on a support plate 33. The servomotor 22 drives a shaft to turn the indicating pointer 14 through the gear mechanism 21 which is mounted between the support plates 33 and 34. A position sensitive potentiometer 35, including a slider 36 coupled to the shaft and a resistance element 37, is mounted on a support plate 40 to produce a balancing feedback signal for the servometric positioning system.

In accordance with this invention, the transparent lens 15 is supported by a cylindrical lens support 41 which in turn is removably attached to an instrument support plate 42. As is best shown in FIGS. 2–5, the lens support 41 comprises basically a hollow cylinder. As best shown in FIG. 2, a series of cutouts 43 are located at one end of the hollow cylinder 41. The purpose of these cutouts will be described in detail later. A second series of cutouts 53 at the opposite end of the cylinder 41 provide a plurality of rearwardly extending legs 44 and a plurality of skirts 47 for shielding light from the internal mechanism. A notch 45 is located at the end of each leg 44 between a pair of extending arms 46, each of which is provided with a dog 49. The dogs 49 are designed to cooperate with a tab 48, which is a part of the instrument support plate 42, in order to attach the lens support 41 to the support plate 42.

Because they form part of a hollow cylinder, the legs 44 and the extending arms 46 have a slight curvature, as is best shown in FIG. 8. Due to the fact that the cylinder 41 is formed of a material such as thin sheet metal, however, the legs 44 may be flattened somewhat by pinching them towards each other. Once they are flattened, they may be slid past the extnding tabs 48 of the support plate 42, as shown in FIG. 9. Once the dog 49 is past the tab 48, the legs 44 may be allowed to spring back to their natural curvature, as shown in FIG. 8. Thereafter, axial movement of the lens support 41 with respect to the support plate 42 is prevented by the engagement of the tabs 48 with the dogs 49. In order to remove the lens support 41 from the support plate 42, the opposite procedure is followed. That is, the legs 44 are once again flattened, as shown in FIG. 9, and the extending arms 46 are slid past the tabs 48 until the lens support 41 is free of the support plate 42.

Figures 7, 7A:
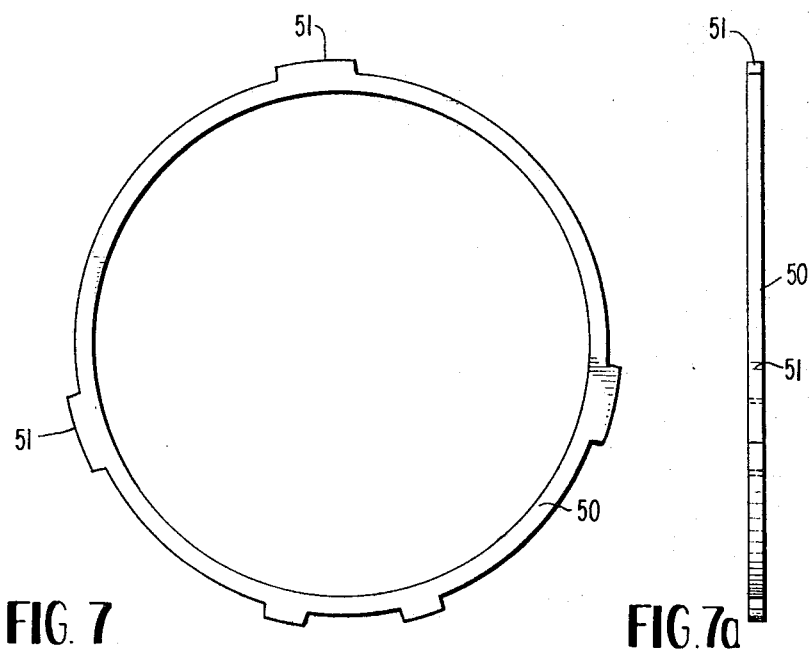
FIGS. 7 and 7a are a plan and side view, respectively, of the spacer.

As previously mentioned above, the cutouts 43 are provided at one end of the lens support 41. The cutouts 43 are spaced to cooperate with a plurality of tabs 51 which extend radially from a spacer 50. The spacer 50, as best shown in FIGS. 7 and 7a, consists of a thin, hollow circular member with the plurality of the tabs 51 extending radially therefrom.

The spacer 50 serves two functions: first, to open the lens support 41 to its proper inner diameter; and second, to axially support the lens 15. Adjustment of the diameter of the lens support 41 is permitted because of a slit 52 which extends through the entire axial length of the lens support 41. Once the spacer 50 is positioned within the support 41, the lens 15 is fastened to the cylindrical support 41 in front of the spacer 50 with epoxy or other suitable cement 54. Since it is desirable that the front of the lens 15 be located exactly with respect to the scale plate 13, a small axial clearance 55 is provided between the lens 15 and the spacer 50. As shown in FIG. 10, this clearance is filled, at least in part, by a fillet of cement 54. As thus described, the front face of the lens 15 may be accurately positioned with respect to the support plate 42, and the lens may then be cemented to the lens support 41. The lens 15 is thus supported axially by the spacer 50 with the fillet of cement 54 interposed between. When desired, the lens may be easily removed from the lens support 41 by merely rolling back (peeling) the support 41 around the circumference of the lens 15. The slit 52 in the lens support 41 permits this rolling back to occur.

As can readily be determined from the above description, there is provided a support for a removable lens of an indicating instrument which axially supports the lens. This axial support eliminates the stresses accompanying a radial cup support, and therefore, eliminates any significant stresses in the cement 54 which connects the lens to the support. This elimination of stresses prevents peeling of the cement at the lens or breakage of the lens itself. Local stresses do occur at the end of the support 41 which supports the lens 53, but these stresses occur only while the legs 44 are pinched to attach the legs 44 to the tabs 48 on the support plate 42.

The preferred embodiment of the lens support for a removable lens in an indicating instrument has been described in connection with the removable spacer 50. It should be obvious to one skilled in the art that the spacer 50 could be made an integral part of the cylindrical lens support 41 and perform the same basic function. The cylindrical support 41 could also be made with a solid wall, rather than with the slit 52 as shown above. This would necessitate removal of the lens in a different manner than the rolling back operation described above, but would still provide the desired axial support.

While a preferred embodiment of this invention has been shown and described, it will be obvious to those skilled in the art that there are certain changes and modifications, such as the above, which may be made without departing from this invention in its broader aspects and, therefore, it is intended that the appended claims cover all such changes and modifications as fall within the true spirit and scope of this invention.

We claim:

What is claimed as new and desired to be secured by Letters Patent of the United States is:

1. A lens support for a condition-responsive indicating instrument which comprises:
    (a) a hollow cylinder, said cylinder including a first series of cutouts at one end thereof, and a second series of cutouts at the opposite end thereof;
    (b) said second series of cutouts forming a plurality of attaching legs and light-shielding skirts;
    (c) a spacer, said spacer being positioned within said cylinder and including positioning means engaging with said first series of cutouts; and
    (d) a support plate, said support plate including attaching means for receiving and supporting said attaching legs; whereby a lens may be cemented to the inner surface of said cylinder and supported in axial direction by said spacer.

2. A lens support as described in claim 1 wherein said spacer is formed as an integral part of said cylinder.

3. The combination for supporting a lens of a condition-responsive indicating instrument which includes:
    (a) a hollow cylcer, said cylinder being spilt along its entire axial length to permit expansion thereof;
    (b) a first series of cutouts at one end of said cylinder;
    (c) a second series of cutouts at the opposite end of said cylinder, said second series of cutouts forming a plurality of attaching legs and a plurality of light-shielding skirts;

(d) a spacer, said spacer being positioned within said cylinder and including positioning means to cooperate with said first series of said cutouts;

(e) a support plate, said support plate including a plurality of tabs for cooperation with said attaching legs; and (f) a lens, said lens being positioned within and cemented to said cylinder next to said spacer, such that said spacer prevents axial movement of said lens while said lens may be removed from said cylinder by merely peeling back said cylinder from said lens.

4. The combination of claims 3 wherein said attaching legs include a notch which is provided with a pair of dogs for cooperation with said tabs of said support plate.

References Cited

UNITED STATES PATENTS

| 2,596,665 | 5/1952 | Eagle | 350—245 |
| 3,454,323 | 7/1969 | Dierks et al. | 350—257 |

DAVID SCHONBERG, Primary Examiner

M. J. TOKAR, Assistant Examiner

U.S. Cl. X.R.

73—431; 248—27; 324—156; 350—114